April 14, 1953 J. A. RAJCHMAN 2,635,201

ELECTRONIC DISCHARGE DEVICE

Filed Sept. 30, 1949 5 Sheets-Sheet 1

INVENTOR
Jan A. Rajchman
BY Morris Kahn
ATTORNEY

April 14, 1953 J. A. RAJCHMAN 2,635,201

ELECTRONIC DISCHARGE DEVICE

Filed Sept. 30, 1949 5 Sheets-Sheet 2

INVENTOR
Jan A. Rajchman
BY Morris L. Rabin
ATTORNEY

April 14, 1953 J. A. RAJCHMAN 2,635,201

ELECTRONIC DISCHARGE DEVICE

Filed Sept. 30, 1949 5 Sheets-Sheet 3

INVENTOR
Jan A. Rajchman
BY Morris Rabkin
ATTORNEY

INVENTOR
Jan A. Rajchman
BY Morris A. Rabkin
ATTORNEY

INVENTOR
Jan A. Rajchman
BY Morris A. Rabkin
ATTORNEY

Patented Apr. 14, 1953 2,635,201

UNITED STATES PATENT OFFICE 2,635,201

ELECTRONIC DISCHARGE DEVICE

Jan A. Rajchman, Princeton, N. J., assignor to Radio Corporation of America, a corporation of Delaware Application September 30, 1949, Serial No. 118,758

18 Claims. (Cl. 313—6)

This invention relates to electronic switching and storage devices, and more particularly to a method of and means for storing a large number of electrical signals which may subsequently be collected and utilized in any desired sequence and at extremely high speeds.

Present systems of computation required a "memory" upon which data to be applied to the system is stored pending entry into the system. A "memory" is also used for the storage therein of partial results obtained by a computer system pending the completion of other operations which may subsequently require the application of the stored information. The greater number of modern computer systems use apparatus in which a number is represented by the presence or absence of one or more signals such as are found in the binary system of numerical computation, wherein all numbers may be represented by combinations of two digits, "zero" and "one." Prior art "memories" comprise either banks of multivibrator tubes interconnected for recording purposes, "delay line" memories, or magnetic tape. These systems, while effective, have the objection of either being complex, or bulky, or too slow in response.

In a copending application, Serial Number 665,031, filed April 26, 1946, for an "Electronic Discharge Device," which is now Patent No. 2,494,670, I have disclosed the details for the construction and use of a target area selection type of memory tube. By means of the unique structure of this tube, a large number of discrete electrical potentials or signals may be recorded or written on any selected areas of the target of the tube. Signals may be collected from any selected areas of the target and the target may be read without erasing the signals stored therein. As shown in the above noted Patent No. 2,494,670, the electronic discharge device described therein may be used as a "memory" for a computer system since, within its single tube envelope, a large number of signals may be conveniently and simply stored and read.

My present invention consists of a new and improved electron discharge device of the type described in above noted patent. The target area selection type of tube disclosed in Patent No. 2,494,670 is complex in construction and in one embodiment has auxiliary accelerating grids besides the target collector electrode all of which require separate bias supplies.

It is an object of my present invention to provide an electron discharge device of the target area selection type which is simple in construction.

It is a further object of my present invention to provide an electron discharge device of the target area selection type which does not require auxiliary accelerating grids, other than the target collector electrode.

The electron discharge device disclosed in Patent No. 2,494,670 requires a negative bias to be applied to those grid bars which repel or deflect electrons from the target area and a positive bias to be applied to those grid bars which frame an opening through which electrons are to pass. A positive bias applied to the selecting grid bars and the accelerating electrodes results in current flowing to these electrodes and represents a power waste. In the case of the selecting bars, this also requires more powerful external driving circuits.

It is still a further object of my present invention to provide an electron discharge device of the target area selection type which is more economical to operate than heretofore.

It is an additional object of my present invention to provide an electron discharge device of the target area selection tube type which requires less powerful external driving circuits than heretofore. In my previous target area selection type of tube, because of capacitive pick-up by the "reading" electrode or the electrode used to collect electrons when a selected area of the target was being scanned, difficulty was experienced at times in distinguishing between the capacitive pick-up current and the current from the target area being scanned.

It is therefore still a further object of my present invention to provide an electron discharge tube of the target area selection tube type wherein capacitive currents to the reading electrode are substantially eliminated.

These and other objects of my invention are achieved by constructing an electron discharge tube having a plurality of spaced coplanar centrally placed cathodes. Vertical grid selecting wires or bars are interposed between and on either side of the cathodes. Horizontal grid selecting wires or bars are placed on either side of and parallel to the plane formed by the cathode-vertical selecting bar array. Adjacent each of the horizontal grid selecting bar arrays is respectively positioned, a first target assembly consisting of a collector plate, a storage target, and a writing plate, and a second target assembly consisting of a reading plate and a Faraday cage including reading output wires and a fluorescent screen. All of these structures, excepting the fluorescent screen, have apertures aligned with the windows defined by the horizontal and vertical grid selecting bars. The reading output wires are positioned inside the Faraday cage so as to be shielded from the electrons passing through the aligned apertures therein. These reading wires receive only the secondary electrons which are emitted by the fluorescent screen as a result of bombardment by the primary electrons which have passed through the Faraday cage apertures.

The novel features of my invention as well as in the invention itself, both as to its organization and method of operation, will best be understood from the following description, when read in connection with the accompanying drawings, in which the same reference numeral is applied to similar functioning parts and in which.

Figures *9a*, *9b* and *9c* are partial sectional views of the electron tube comprising an embodiment of my invention wherein typical electron paths are shown.

DESCRIPTION OF THE TUBE

For the purposes of explanation of my invention, a tube having eight cathodes, nine vertical grid selecting wires or bars, thirty-six horizontal grid selecting wires or bars and two targets, each providing 128 recording areas or eyelets, is illustrated. This is not to be taken as a limitation since the basic principles and construction herein set forth may be used to amplify or diminish the capacity of the tube from the 256 recording areas to practically any desired number.

Figure 1:
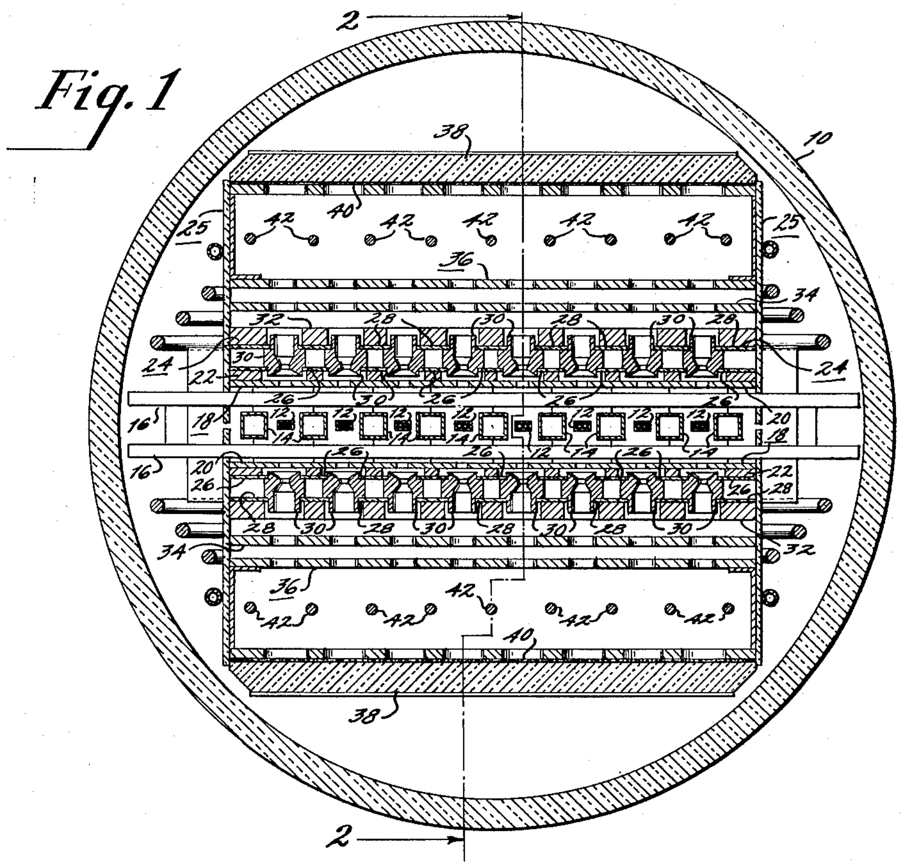
Figure 1 represents a diametral section of an electron discharge tube comprising an embodiment of my invention.

Considering Figure 1, it may be seen that the tube is in a glass envelope 10 and is constructed symmetrically about a plane formed by the cathodes 12. The cathodes 12 are preferably of a rectangular cross section. The cathodes 12 are alternate with, between and parallel to a set of nine vertical selecting bars or wires 14 of square cross section. The cathodes 12 are also substantially co-extensive with these vertical selecting wires 14. On either side of the plane was made by the cathodes 12 and the vertical selecting bars 14 is a set of 18 parallel horizontal selecting bars 16 of square cross section. These two sets of horizontal selecting bars are parallel to and sandwich the cathodes and vertical bars, as do all the subsequent electrodes of the tube. The individual horizontal and vertical selecting bars each constitutes an active element of the grid structure and each functions in the manner, subsequently more fully explained, to enable selection of a predetermined portion of the target for bombardment by electrons.

It will be readily appreciated that, when viewed perpendicularly to the parallel planes formed by the vertical and horizontal selecting bars, a grid mesh is seen having square openings or windows in which the horizontal sides are defined by two adjacent horizontal selecting bars and the vertical sides are defined by two adjacent vertical selecting bars. These windows are perpendicular to the path of the electrons from the electron source to the target and electrons may pass through them.

Spaced on either outer side of the horizontal selecting bars 16, and parallel to the plane thereof is positioned a first target assembly 24. This first target assembly consists of a collector electrode 18, a storage target and a writing electrode 32. The collector electrode 18 is made of two flat metal plates 20, 22 perforated with round holes whose centers are aligned with the centers of the windows formed by the vertical and horizontal selecting bars. The first plate 20 which is nearest the horizontal selecting bars is known as the collector mask and has the smaller holes. The second plate or collector spacer 22 is in intimate contact with the collector mask and has the larger holes. Typical values for these holes are 0.040 inch diameter for the collector mask 20 and 0.150 inch diameter for the collector spacer 22.

On the outer side of each of the collector electrodes 18 is positioned the storage target assembly. This consists of two perforated sheets 26, 28 of an insulating material, such as mica, holding between them, by means of the perforations, 128 metallic eyelets 30. Next comes another metallic plate with aligned perforations which is known as the writing plate 32. The eyelets 30 are generally cylindrical and have shoulder offset portions to be insulatingly retained thereby by the perforated mica sheets. The perforations in the insulating sheets 26, 28 are so spaced as to position the eyelet openings opposite the center of the respective grid bar windows. An eyelet comprises a conical head, a center hole, a collar and a tail. The eyelets 30 may be made from turned pieces of steel which are subsequently nickel plated in order to improve the uniformity of their secondary emission. The writing plate 32 as shown, is separated from the eyelets 30 by the insulating sheet 28 and serves as a common capacity plate for all the eyelets 30 with which it is associated. The two collector plates 20, 22, the two insulating sheets 26, 28 supporting the eyelets 30 and the writing plate 32 form a tight assembly which is riveted together on the upper and lower ends and in the center. This target assembly 24 is more fully shown and described in my application Serial Number 122,657 filed October 15, 1949, for a "Target for Storage Tubes," now Patent No. 2,604,606, issued July 22, 1952.

On the outer side of the either target assembly 24 and spaced therefrom is a second target assembly 25 consisting of a "reading" plate 34 which is another metallic plate having one hundred and twenty-eight perforations substantially aligned with the centers of the windows formed by the horizontal and vertical selecting bars.

Beyond each of the reading plates is a Faraday cage 36. This comprises a rectangular metallic box in which two walls are parallel to the reading plate and have one hundred and twenty-eight perforations aligned with the reading plate perforations. A glass plate 38 coated with a fluorescent and secondary electron emitting material 40, such as willemite, is placed against the outer perforated wall of the Faraday cage. In the central plane of the cage there are nine "reading" wires 42 which are positioned so that they are between the perforations in the perforated walls and are thus shielded from any electrons which may be coming directly from the target. The reading wires are also substantially shielded from electrostatic field leakage from the reading plate. These reading wires are connected together and the corresponding lead to the stem of the tube is shielded. This second target assembly 25 is also more fully shown and described in my application Serial Number 122,657 filed October 15, 1949, for a "Target for Storage Electron Tubes," now Patent No. 2,604,606, issued July 22, 1952.

Figure 2:
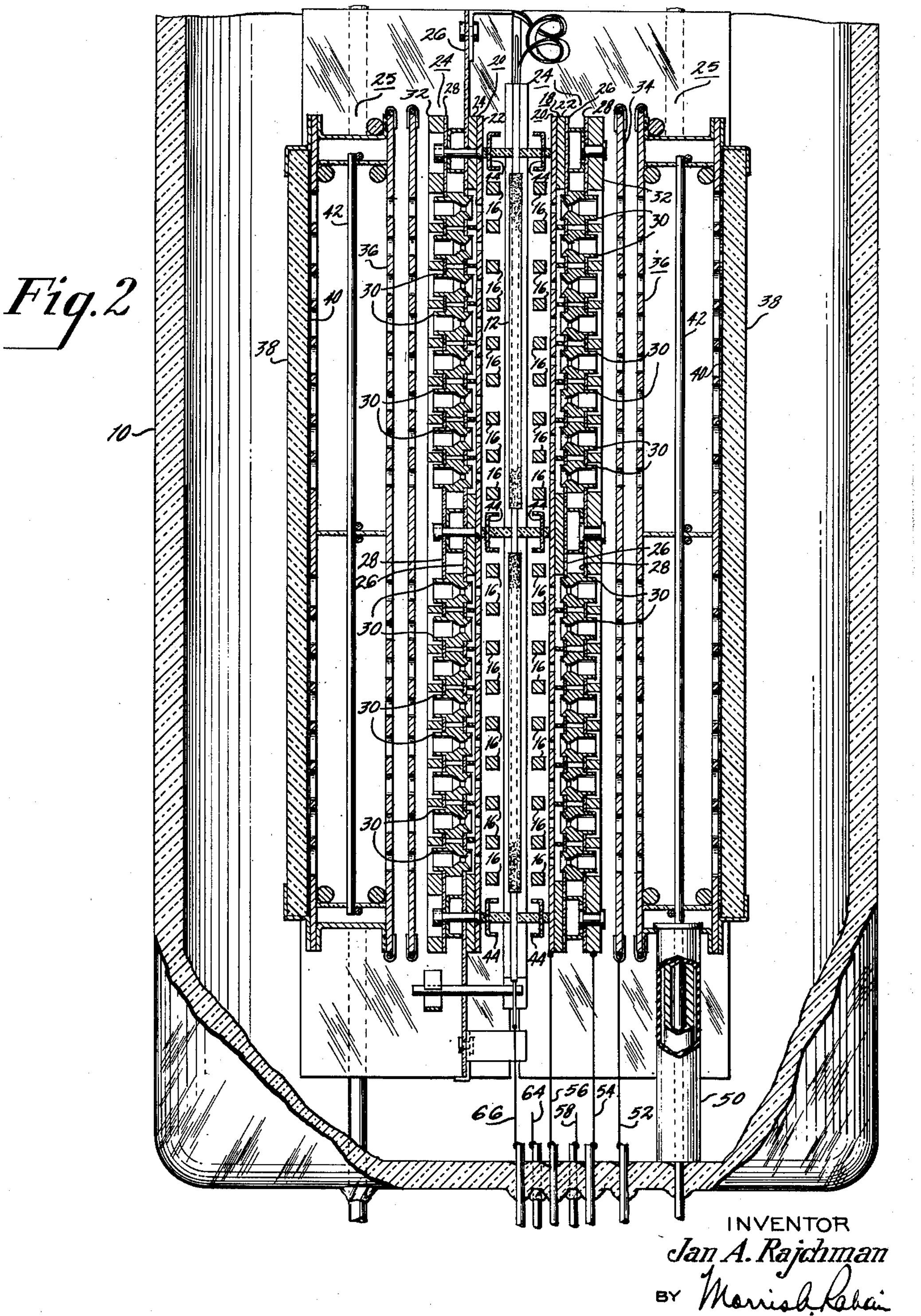
Figure 2 represents an axial cross section of the electron discharge tube comprising an embodiment of my invention.

Figure 2 illustrates an axial cross section of the tube and further demonstrates the symmetrical construction thereof. In view of this symmetry the tube may be used as a one channel device with 256 storing elements or as a two-channel device with 128 elements for each channel. For this reason, leads are brought out separately from the elements of each of the halves, but they are arranged for easy interconnection as a one channel or a two channel device.

Referring to Figure 2, the reading wires 42 are connected to the shielded lead 50 and are thereby brought externally from the evacuated glass bulb 10. The reading plate lead 52, the writing plate lead 54, and the collector plate lead 56 are all brought external to the tube for the purpose of applying the proper biasing voltages thereto. The lead 58 and the lead 64 are respectively representative of a lead from each horizontal and from each vertical selecting bar which are being brought external to the tube for applying bias thereto. An alternative method for interconnecting the selecting bars and then connecting these interconnections to the leads so that fewer external leads are required is discussed below in connection with Figure 4. The above indicated leads for external connection of the internal structure of the tube is only shown for one half of the tube. It is to be understood that similarly placed leads and in similar number are required for the other half of the tube. Lead 66 is the lead from the cathode for the purpose of external connection thereto. Connection to the cathode heaters is made in a manner well known to the art.

The collector plate has regions at its ends and center which are without operating holes, which are used for fastening the "sandwiches" holding together the collector, mica sheets holding the eyelets and the writing plate. If these regions of the collector were directly exposed to the cathode, considerable power would be wasted by electron bombardment. The emission from the cathode is prevented from reaching these regions of the collector plate by means of U-shaped channels, 44, made of a metallic material, which also serve to support the ceramics holding the cathodes.

Figure 3:
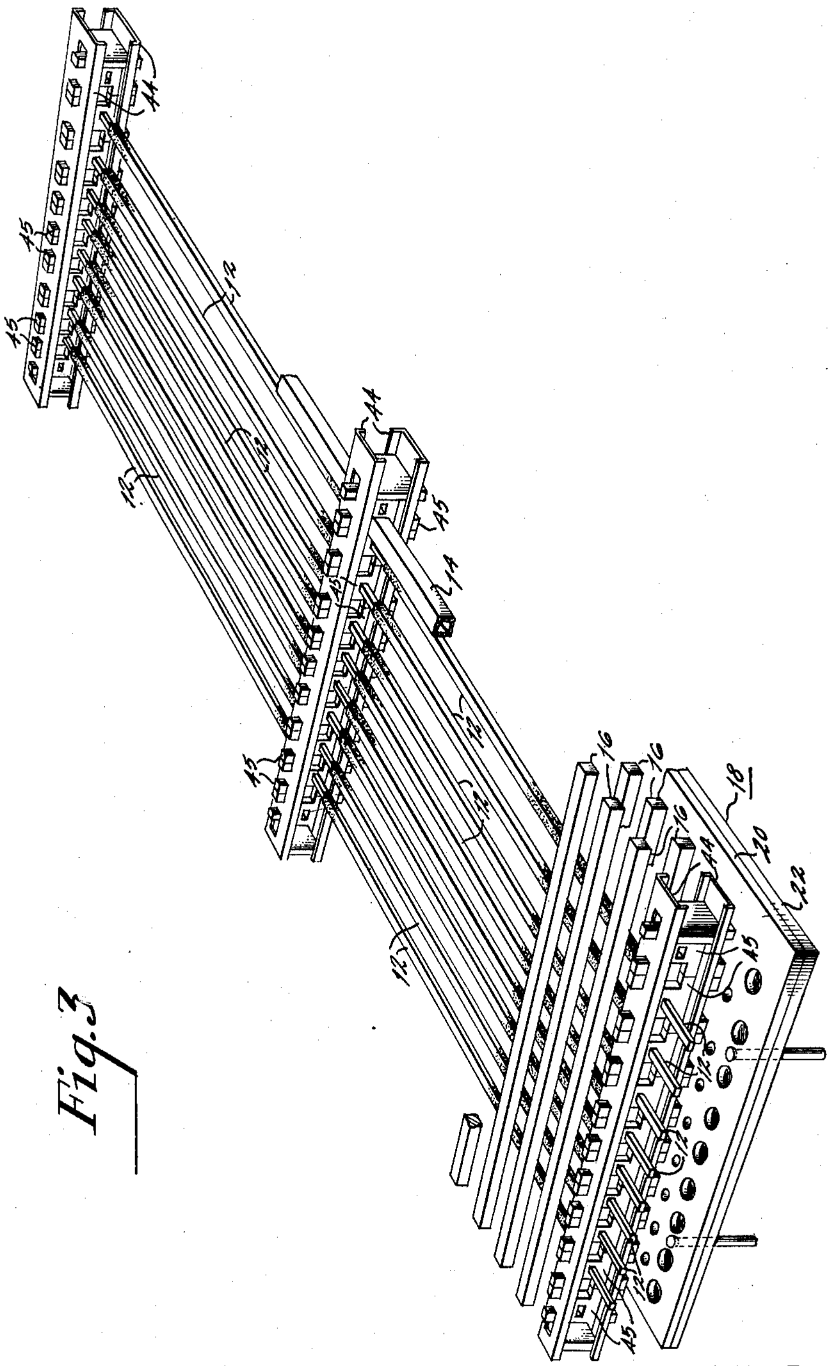
Figure 3 represents a perspective view of the cathode assembly of the electron tube comprising an embodiment of my invention.

Referring to Figure 3, there is shown in perspective the cathode assembly which is a feature of this invention. Six U-shaped channels 44 are assembled in three pairs. Each pair holds ten H-shaped ceramics 45. The arms of the H-shaped ceramics 45 fit in special holes in the collector masking plates 20 and serve to space the target assembly 24 from the cathodes. The collector electrode 18 is shown dropped below its normal position for the purposes of illustration of the cathode assembly. In the center of the cross arm of each H-shaped ceramic 45 is a hole through which a cathode 12 passes. The arms of the H-shaped ceramics have U-shaped openings at the region near the cross arm of the H. The abutting H-shaped ceramics thus provide openings for supporting the vertical selecting wires 14 between the cathodes. The eight cathodes 12 are assembled in their final holders, then the whole assembly is sprayed and it is then set in between two first target assemblies. The U-shaped channels are operated at cathode potential and by this means prevent waste of current to the ends and center of the collector mask 20.

In my copending application, Serial Number 665,031, filed April 26, 1946, for Electronic Discharge Devices, which is now Patent No. 2,494,670, there has been explained at length the method by which the selection of an area of a target is made by applying the proper bias to the selecting bars defining the window which opposes the target area selected. Reference should be made thereto for detailed consideration of the subject. Briefly, however, it is explained therein that, when all four selecting bars defining a window are at cathode potential or higher, electrons can pass through that window. Should any one of the selecting bars defining the window be at a potential which is sufficiently lower than cathode potential then electrons do not pass through that window but are deflected therefrom. This assumes that there is a sufficient accelerating potential exerted on the electrons to enable them to pass through the window when the defining selecting bars are at cathode potential. In order to secure the required accelerating potential in the target area selection tube described in my previous above noted application, in one form the selecting bars are all positively biased to permit the passage of electrons therethrough, and have their bias lowered to cathode potential or slightly negative to block electron passage. In another form, positively biased, accelerating electrodes are interposed both between the horizontal and vertical selecting bars and between the cathode and the selecting bars and the selecting bars are then either biased to cathode potential to permit passage therethrough of electrons or are biased highly negative to block such passage. The provision of a sufficient accelerating potential is thus provided either by the selecting bars themselves or the accelerating electrodes.

In my present invention, because of its structure, the collector plate 18, which is positively biased, acts to provide the required accelerating potential. In order to permit passage of electrons from the cathode through a window the selecting bars defining that window are left at cathode potential. Biasing any of the selecting bars defining a window sufficiently negative with respect to the cathode prevents further passage of electrons through that window. Since the two potential values applied to the selecting bars are either cathode potential or a negative potential with respect to the cathode, it will be appreciated that the power requirements for the selecting bars is minimal, since these bars never draw any current. Furthermore, the cathode potential is easily attained with accuracy in external circuits, while the negative voltage is not critical.

For biasing purposes, each of the vertical 14 and horizontal selecting bars 16 may be individually insulated and brought out through the envelope of the tube and separately biased so that the window opposing the desired target area is opened. Methods for effecting complete control of the windows defined by the vertical and horizontal selecting bars utilizing a number of external leads which is less than the number of horizontal and vertical selecting bars have been described and claimed in my copending application, Serial Number 702,775, filed October 11, 1946, now Patent No. 2,558,460, and in the application of George W. Brown, Serial Number 694,041, filed August 30, 1946, now Patent No. 2,519,172.

The principle of the combinatorial connections by means of which the number of external leads can be greatly reduced is the fact that the electron current through a gate formed by two metal bars can be controlled by either bar. In the case of the window any of the 4 defining bars can stop the current. In the present system the stoppage of current is actually affected by suppressing almost totally the emission from the particular area of the cathode corresponding to a window by biasing any one of the horizontal or vertical bars forming it. The small remaining part, perhaps 1 percent, is so badly deflected off the direction of the axis of the hole that it strikes one face of the collector electrode 18 without reaching the eyelet 30. In the previous aforementioned target area selection tubes the emission from the cathode was not suppressed, but merely directed to other electrodes.

Figure 4:
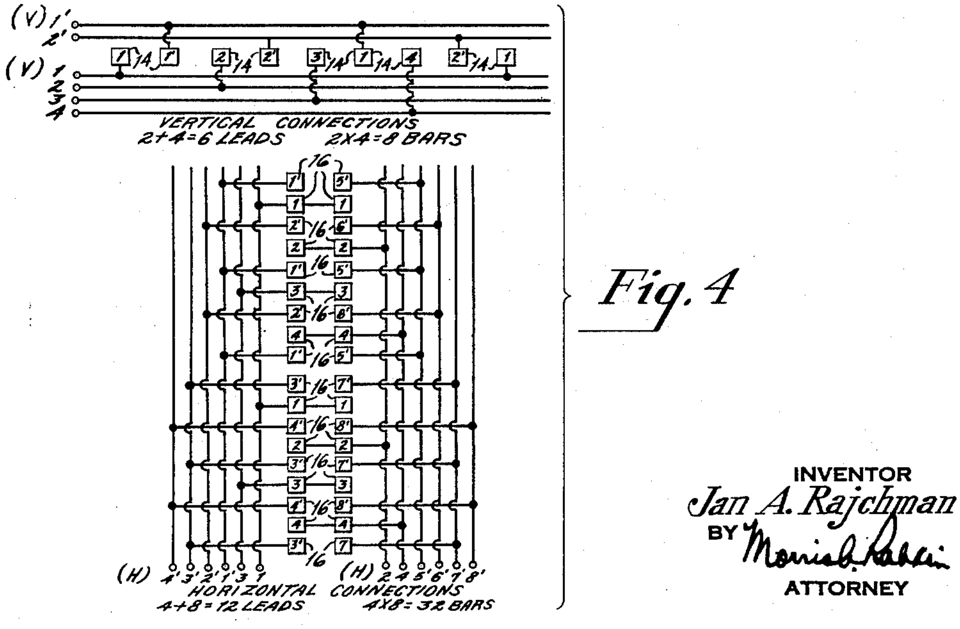
Figure 4 is a schematic diagram of my preferred method of interconnection of the vertical and horizontal selecting bars and their connection to the external leads in the electron discharge tube comprising an embodiment of my invention.

Referring to Figure 4 wherein is shown my preferred system of combinatorial connection of the selecting bars, the nine vertical selecting bars 14 are connected to six separate leads which are brought external to the tube. These leads are in two groups and are designated as $V_1$, $V_2$, $V_3$, $V_4$ and $V_1'$, and $V_2'$. The thirty-six horizontal selecting bars are connected to twelve separate leads which are brought external to the tube. These leads are also in two groups and are designated $H_1$, $H_2$, $H_3$, $H_4$, and $H_1'$, $H_2'$, $H_3'$, $H_4'$, $H_5'$, $H_6'$, $H_7'$ and $H_8'$. The nine vertical selecting bars 14 are employed to operate as eight gates since there are only eight combinations of $V_1$, $V_2$, $V_3$, $V_4$ and $V_1'$ and $V_2'$ taken two at a time. The 36 horizontal selecting bars are employed to operate as 32 gates since there are only thirty-two combinations of $H_1$, $H_2$, $H_3$, $H_4$ and $H_1'$ through $H_8'$ taken two at a time. The excess number of bars are used to take care of the end effects. The eight vertical gates and 32 horizontal gates separately control 256 windows. For operation of the tube as a two channel device leads $H_1'$ and $H_5'$, $H_2'$ and $H_6'$, $H_3'$ and $H_7'$, and $H_4'$ and $H_8'$ should be connected together.

Because of the positioning of the vertical selecting bars adjacent each cathode and also the horizontal selecting bars adjacent the cathode, all these bars being at cathode potential, and because of the positive collector plate with its holes in register with the windows formed by the selecting bars, an almost perfect electron optical system is formed. Emission from the cathode is sharply focussed through the collector hole. No current goes to the vertical and horizontal selecting bars because of this focussing and because they are at cathode potential. Furthermore, because of the sharp focussing action, very few electrons strike the collector plate but most of them are directed through the perforations and at the storing eyelets 30.

OPERATION OF THE TUBE

In the quiescent state of the tube, the vertical and horizontal selecting bars are all at cathode potential and the collector plate 18 is positively biased with reference thereto. The electrons emitted by the cathodes will therefore be focused into 256 beams by the combined action of the vertical and horizontal selecting bars which form 256 windows. These 256 beams are focused through the center of the collector holes and are directed at the heads of the eyelets 30.

Figure 5:
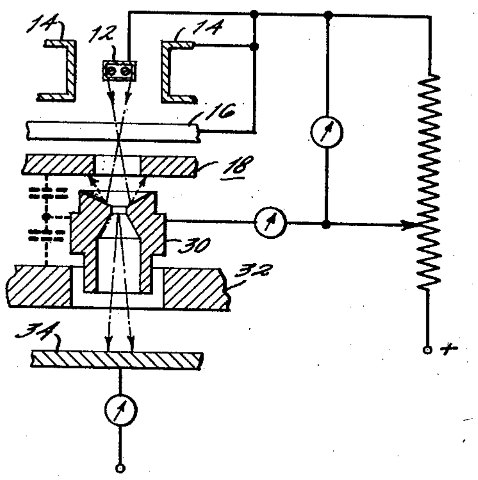
Figure 5 is a diagram showing the connections for determining the current-voltage characteristics of an eyelet which is a part of the target in the electron discharge tube comprising an embodiment of my invention.
Figure 6:
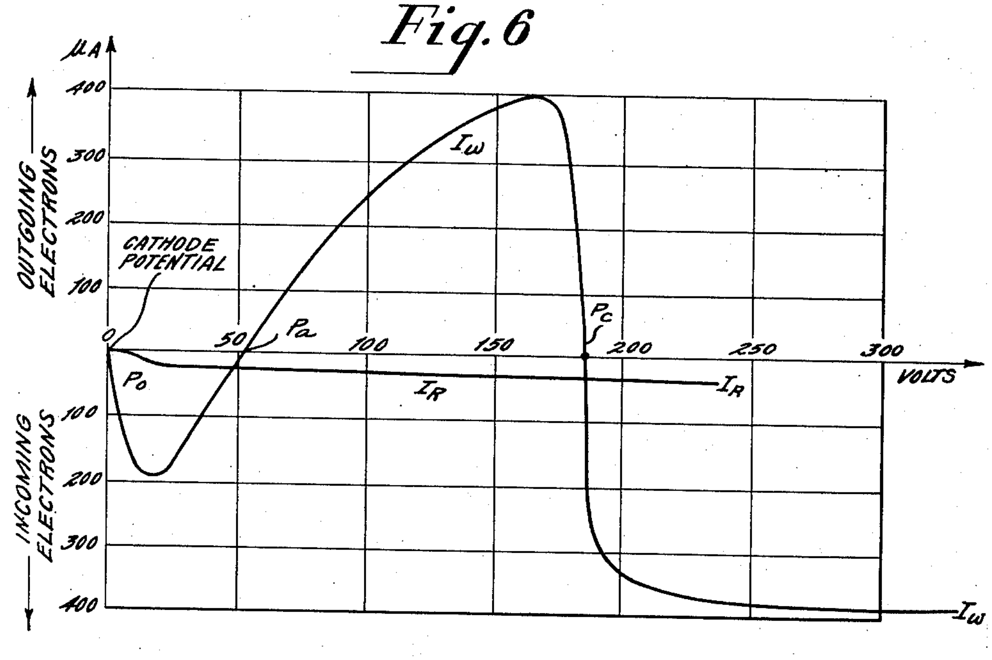
Figure 6 shows curves of the eyelet-current voltage characteristic and voltage-reading current characteristic as determined by using the connections shown in Figure 4.

Figure 5 shows the connections for obtaining the current voltage characteristics of an eyelet 30 when it is receiving electrons from the cathode 12. The current $I_w$ to the eyelet head as a function of the forcefully applied potential V to it by a hypothetical lead is shown in Figure 6. This curve shows that the eyelet is at a stable potential either at the potential $Po$ which is near that of the cathode, or at Pc, the potential near that of the collector. For these two potential values of the eyelet no electron current is received by it. At the potential $Po$ the eyelet repels substantially all electrons to the collector plate since it is at cathode potential or slightly negative with respect to the cathode. If the potential of the eyelet is made higher than Pc it will collect electrons until it reaches the potential point Pc. If the eyelet potential is between the potential points $Pa$ and Pc, shown on the curve $I_w$, the eyelet emits more electrons by secondary emission than it receives until its potential stabilizes at the potential point Pc. If the eyelet potential is between points $Pa$ and Po, it will collect electrons until it stabilizes at potential point Po. Potential point $Pa$ is a very unstable one and the eyelet does not remain at that potential but goes either to potential $Po$ or to potential Pc.

As the potential of the eyelet increases above Po, becoming more positive, it permits more and more of the electrons coming from the cathode to pass through the eyelet. This is quite similar to a normal electron grid effect. The value of the current flowing as a result of these electrons passing through an eyelet is shown by the $Ir$ curve in Figure 6. When the eyelet is at its low equilibrium potential Po, near cathode potential, it has a "grid-action" effect and stops the passage of electrons through its central hole, and as shown in Figure 6, the reading current $Ir=0$. When more positive, particularly at the equilibrium potential Pc, near the collector potential, the eyelet permits the flow of a substantial current $Ir$ through it. This current is about one tenth of the primary current reaching the head of the eyelet for the particular shape described here. If the reading plate is made sufficiently negative (about −70 volts) the current passing through the eyelet does not reach the Faraday cage.

Summarizing the foregoing, each eyelet has two stable potential points, Po or approximately cathode potential at which potential no current passes through the eyelet and Pc or approximately collector potential at which potential a current (the reading current) passes through the eyelet.

TARGET ELEMENT SELECTION

The act of writing or reading requires the selection of one eyelet 30 or target element (two eyelets or target elements if the two halves of the tubes are run in parallel). This selection is obtained by applying a negative pulse to all the selecting leads except to the one in each of the four groups V, V', H and H' which connect to the selecting bars which define the window which is associated with the desired eyelet. These leads are left at cathode potential. The minimum amplitude of the selecting pulse necessary to produce cutoff is dependent upon the value of the collector voltage (about −250 volts for 180 volts on the collector). The maximum amplitude of the selecting pulse is limited only by the tube breakdown factor and driving circuit economy.

Figure 7:
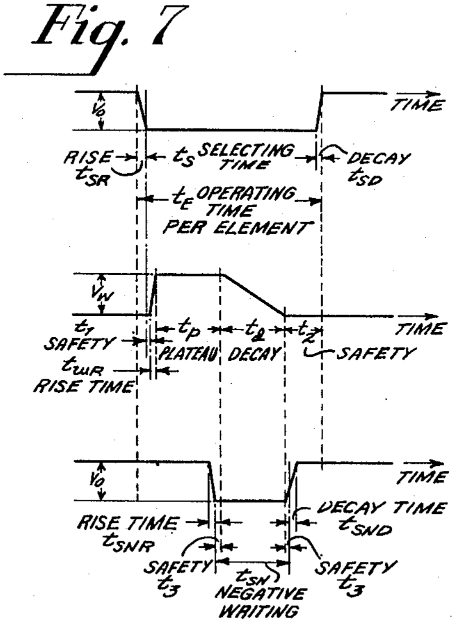
Figure 7 represents typical pulse-shapes and pulse-durations required in "writing" into the electron discharge tube comprising an embodiment of my invention; and, Figure 8 represents typical pulse-shapes and pulse durations required in "reading" from the electron discharge tube comprising an embodiment of my invention.

Figure 7 is a curve of a typical selecting pulse having an amplitude $V_o$. The pulse rise time "*tsr*" and the pulse decay time "*tsd*" can be arbitrarily short or reasonably long, their duration determining the economy of time in the operation of the tube in relation to economy in the driving circuit. The duration of the plateau "*ts*," which is the selecting time, must be sufficiently long to permit all the operations necessary for writing and reading. This may be as low as four microseconds, but I prefer a plateau of 20 microseconds.

WRITING IN THE TARGET AREA SELECTION TUBE

The writing or registering of signals in the tube is done one eyelet at a time (or two if the tube is used as a two channel device). First a selecting pulse is applied to all selecting leads except the one in each of the groups V, V′, H, and H′ which is connected to the selecting bars defining the window associated with the desired eyelet. Some arbitrarily short safety period "*ti*" after the application of the selecting pulse, a positive pulse $V_w$ (see Figure 7), is applied to the writing plate 32 (a writing pulse). This plate is capacitively coupled to all eyelets 30 by their tails. The eyelets are also capacitively coupled to the collector plate 18. The capacity between the eyelet 30 and the writing plate 32 is approximately one micromicrofarad and the capacity between the eyelet 30 and the collector plate 18 is also approximately one micromicrofarad. Therefore, in the absence of any electronic current, the potential of the eyelet will rise by ½ $V_w$ volts. In the presence of the normal electronic current, with the associated window open, the potential of the eyelet will still rise a substantial part of ½ $V_w$ if the rise time of the pulse is made sufficiently short (approximately ¼ microsecond) so as to make the displacement current to the eyelet substantially larger than the electronic current. The minimum operating value of the voltage $V_w$ which can be chosen is slightly more than twice the voltage between potential $P_a$ and the collector plate voltage $P_c$. By way of example, this value is 260 volts for a collector plate voltage of 180 volts and a $P_a$ voltage of 50 volts.

During the plateau time "*tp*" following the rapid rise of the writing pulse $V_w$, the potential of the eyelet 30 will come to a value which is very nearly the collector plate potential, for the reasons previously explained. This occurs regardless of the initial potential of the eyelet, whether $P_o$ or $P_c$. If the eyelet potential is initially $P_o$, then the rise of the writing pulse $V_w$ will bring the eyelet potential into the positive loop of the current-voltage characteristic curve $I_w$ and during the plateau time the positive current will bring it to $P_c$. (If the value of the pulse $V_w$ is so high that it brings the eyelet into the negative current region the eyelet will still settle at $P_c$.) If, on the other hand, the eyelets' position was originally $P_c$, it will be pushed up into a region of negative current and will settle during the plateau time back to $P_c$. The length of the plateau time "*tp*" of the writing pulse $V_w$ must be sufficient to allow the charging of the capacity of the eyelet to roughly the collector voltage. The theoretical minimum is about one microsecond but I prefer to use five microseconds for the plateau time "*tp*."

If it is desired to write positively, no other selecting pulse is applied and the writing pulse is allowed to decay in "*td*" microseconds. The eyelet finds itself at the collector potential $P_c$ at the start of the decay. As the decay starts, a competition arises between the negative displacement current due to the falling writing plate pulse and the positive electronic current due to secondary emission. If the decay time "*td*" is sufficiently long, about equal to the plateau time "*tp*," the electronic current will be greater than the displacement current and the eyelet 30 will end up by being at $P_c$ volts. Accordingly, this decay time "*td*" has an irreducible minimum time. It is on the order of one microsecond but I prefer using five microseconds.

If it is desired to write negatively into the selected eyelet, a negative writing pulse $V_n$ is applied to one or more of the leads in the groups V, V′, H, H′, which during selection was left at cathode potential to keep open the window associated with the selected eyelet. This negative pulse $V_n$ is on the same order of amplitude as the pulse $V_o$ which is applied to all the other selecting bar leads. The negative writing pulse $V_n$ is applied some arbitrarily short safety period "*ts*" before the decay of the writing pulse $V_w$ and stops some safety period "*t4*" thereafter. The rise time "*tsnr*" and decay time "*tsnd*" of the negative writing pulse $V_n$ are arbitrarily long or short within the limits of the writing pulse itself. Since the electronic current to the eyelet is cut off by the negative writing pulse $V_n$, the displacement current caused by the decaying positive writing pulse $V_w$ carries the eyelet down to substantially the cathode potential $P_o$ or to the region of the negative loop of the voltage-current characteristic curve $I_w$ from whence it readily settles at the potential $P_o$ when the electron current is restored.

After the end of the writing pulse (after a time *t2* selected arbitrarily) the selecting pulse $V_o$ is ended and current is re-established to all the eyelets. All eyelets but the selected one have the same potentials as they had previous to application of the writing pulse. These other eyelets simply went for a "potential ride" when the writing pulse was applied to the writing plate. They did not change their potential since no D. C. potential can be transmitted through a condenser without some non-linear coupling to it. Therefore, at the instant at which all the current is re-established, all eyelets but the selected one will have substantially the same potential as they had previous to the application of the writing pulse. Any possible deviation from these initial potentials due to secondary effects, such as leakage, will be compensated for immediately after the re-establishment of all the stabilizing holding currents.

READING OR INTERROGATING THE TARGET AREA SELECTION TUBE

Figure 8:
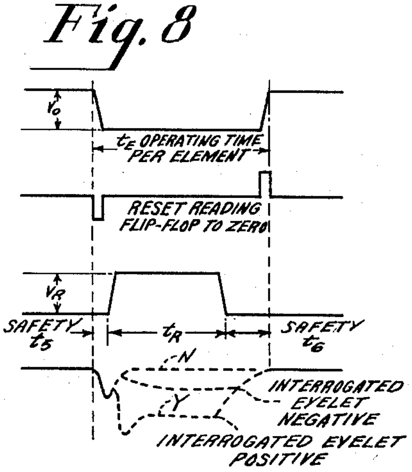

The reading or interrogating of the tube is done one eyelet at a time (or two if the tube is used as a two channel device). First a selecting pulse $V_o$ is applied (see Figure 8) to all leads to the selecting bars except the one in each of the groups V, V′, H and H′ which connect to the selecting bars defining the window associated with the eyelet desired to be read. Some arbitrary short safety period "$t5$" thereafter, a positive reading pulse $V_v$ of about 100 volts is applied to the reading plate which was previously negatively biased. A pulse of electron current flows to the reading wires as a result of this reading pulse $V_r$ if the selected eyelet is at the potential point $P_c$ but no electron current flows if the eyelet is at the potential Po. Some arbitrarily safe time "$t6$" after the end of the reading pulse the selecting pulse Vo is ended and this marks the end of the reading time. Because of a slight capacitive pickup from the selecting bars the typical voltage pulses on the reading wires for the negative and positive conditions of the eyelet are shown respectively as curve N and curve Y in Figure 7. Curve N is shown somewhat exaggerated. As explained previously, when the reading pulse is applied to the reading plate 34, electrons pass through the eyelet 30, if at potential $P_c$, through the reading plate holes, through the Faraday cage 34 until they strike the fluorescent screen 40. The area of the screen defined by the holes in the Faraday cage 34 fluoresces and secondary electrons are emitted and are attracted to the reading wires 42. Thus a visual, as well as an electrical indication, is given as to whether an eyelet is at $P_c$ or $P_o$ potential. The reading has no effect on the eyelet potential.

In general a certain minimum period of quiescence following writing or reading from one eyelet is necessary before writing or reading in another eyelet. In this period any slight deviations from the normal equilibrium potentials which the unselected eyelets suffered during the selection time, due to ohmic leakage or other extraneous causes, will be compensated by the restoring mechanism of the electron bombardment as explained heretofore. However, this required quiescent period has been found to be very small, since the ratio of the time the eyelets keep their information without benefit of electron bombardment, to the selection time is at least 1000, the quiescent period need only be one thousandth of the selection period. Alternatively, successive writings or readings could succeed each other without quiescent periods for 1000 times and can then be cured by one period of electron bombardment. I prefer to use a standard quiescent period following each writing or reading equal to at least one-half the selection period.

Figures 9A, 9B, 9C:
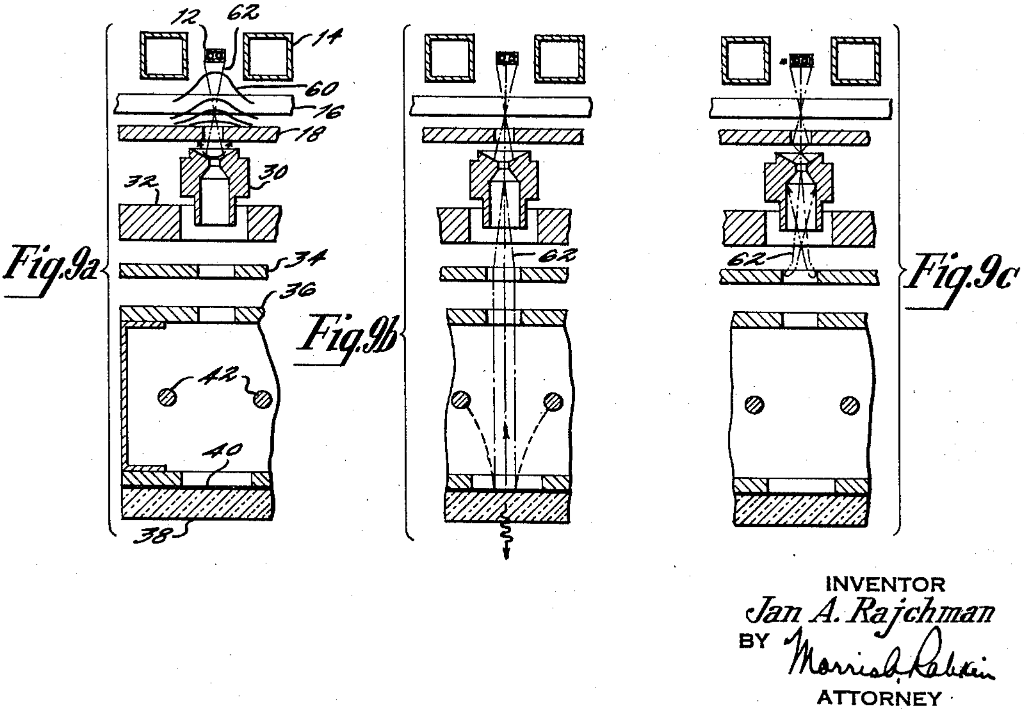

Figure 9*a* shows the electron path 62 from the cathode when the eyelet is at cathode potential Po. As shown, no electrons pass through the eyelet hole. Equipotential lines 60 between the cathode and target are also indicated.

Figure 9*b* shows the electron path 62 from the cathode when the eyelet as at collector potential $P_c$ and the reading plate is biased positively to permit reading. The electrons pass through the eyelet and into the Faraday cage where they strike the fluorescent screen 40 and cause secondary electrons to be emitted which are captured by the reading wires 42. Thus the screen fluoresces and an electric current flows in the reading wires 42 for the particular eyelet 30 selected.

Figure 9*c* shows the electron path 62 from the cathode 12 when the eyelet is at collector potential $P_c$ and the reading plate 34 is biased negatively. Electrons will pass through the eyelet hole but will be turned back by the reading plate 34 so that they cannot reach the Faraday cage.

The following tables present some typical data on a target area selection tube having 256 eyelets which was constructed in accordance with the principles herein set forth:

TABLE I

| | |
|---|---|
| Heater current series connection | .65 amp. |
| Heater voltage series connection | 40 volts. |
| Center tap of heater | Floating or cathode potential. |
| Heater current parallel connection | 1.26 amp. |
| Heater voltage parallel connection | 20 volts. |
| Heater to cathode voltage | 100 volts max. |
| Cathode voltage | 0 volt (reference). |
| Cathode current all gates open | 100 ma. (+−20 ma.). |
| Cathode current one selected element | 500 μa. |
| Cathode current all gates closed | 0 ma. |
| V selecting bars. Open gate voltage | 0 volt (+−5 allowable). |
| $V_{ov}$ cutoff voltage for V bars | −250 volts—min. |
| H selecting bars. Open gate voltage | 0 volt (+−5 allowable). |
| $V_{oH}$ cutoff voltage for H bars | −250 volts min. |
| V and H bar current | Zero with bars not positive. |
| U-shaped collector shield | Connected to cathode. |
| Collector voltage $V_c$ | +180 volts (160 to 220 volts). |
| Collector current all gates open (max.) | 90% to 100% cathode current. |
| Collector current all gates closed (min.) | 0 ma. |
| Writing plate (capacity plate) D. C. bias (has focusing effect only). | 0+−50 volts. |
| Writing plate current | Zero at all times. |
| Amplitude of pulse on writing plate | 360 volts safe min. 4/3 Vc absolute min. |
| Reading plate D. C. bias operation | −70 volts. |
| Reading plate pulse amplitude | +100 volts. |
| Reading plate D. C. bias monitoring (focus effect). | 0 to +300 volts. |
| Reading plate current | Zero at all times. |
| Faraday cage or fluorescent screen voltage (light level). | +300 to +900 volts. |
| Cage current | Zero (with reading wires voltage as specified). |
| Reading wires voltage | At least 200 volts more than cage voltage. |
| Reading wires current, all positive elements | 10 ma. max. |
| Reading wires current per element | 20 to 40 μa. |

TABLE II

*Electrostatic capacity of control electrodes in target area selection tube*

The capacities listed below are between the named electrode and all other electrodes of the tube connected together. All capacities in micromicrofarads.

| | |
|---|---|
| $V_1$ | 16 |
| $V_2$ | 30 |
| $V_3$ | 12 |
| $V_4$ | 28 |
| $V_1'$ | 25 |
| $V_2'$ | 25 |
| $H_1$ | 20 |
| $H_2$ | 19 |
| $H_3$ | 21 |
| $H_4$ | 19 |
| $H_1'$ | 16 |
| $H_2'$ | 12 |
| $H_3'$ | 17 |
| $H_4'$ | 12 |
| $H_5'$ | 17 |
| $H_6'$ | 13 |
| $H_7'$ | 17 |
| $H_8'$ | 12 |
| Collector | 208 |
| Writing plates each | 100 |
| Reading wires each side | 15 |
| Reading plate each side | 60 |

It should be noted that the method of reading disclosed in Patent No. 2,494,670, for an "Electronic Discharge Device," is also alternatively utilizable with the present embodiment of my invention. Briefly, in this alternative method, a slightly negative potential is applied to the writing plate 32 after the eyelet 30 desired has been selected. If the eyelet 30 was originally at the potential Po, driving it more negative will not have any effect, no electrons are attracted and the eyelet subsides with the subsiding pulse on the signal plate back to the potential Po. When the eyelet selected is at the potential Pc, a slight negative pulse on the writing plate drives the eyelet slightly negative with respect to potential Pc, but it still stays well within the positive loop of the characteristic curve Iw. As the signal plate negative pulse subsides, the eyelet goes slightly more positive than Pc and then subsides to Pc. This causes a displacement current to flow in the writing plate which constitutes the output signal.

From the foregoing description it will be readily apparent that I have provided an improved electron tube device which is utilizable for selectively storing information for an indefinite period in the form of a potential Po or a potential Pc and selectively reading such information both visually, by the presence or absence of light, and electrically, by the presence or absence of a "reading" current. Such information is stored as long as may be desired, reading does not erase it. Furthermore, new information may be written directly over the previous information stored in the tube without the necessity of first erasing such previously stored information.

It will be apparent to those skilled in the art that many other embodiments are possible all within the spirit and scope of my invention. For example, the tube may be constructed with only one set of horizontal selecting bars, one first target assembly and one second target assembly instead of the symmetrical arrangement described above. Alternatively, the Faraday cage may be omitted and readings may be made only visually as heretofore, or electrically by selecting an eyelet and biasing the reading plate sufficiently negative to capture any electrons passing through the eyelet. Other types of storage targets may be used such as are set forth in my application, Serial Number 722,194 for "Electron Storage Device with Grid Control Action," filed January 15, 1947, and now Patent No. 2,513,743.

I therefore desire that the foregoing description shall be taken as illustrative and not as limiting.

What is claimed is:

1. An electron discharge device having a grid structure comprising two networks of spaced parallel horizontal selecting elements, and a network of spaced parallel vertical selecting elements enclosed between said first named two networks, a plurality of cathodes interposed between, alternating and coplanar with the elements of said network of parallel vertical selecting elements, and connections to said elements by means of which a predetermined bias may be applied to selected elements of said networks for suppressing emission from those cathodes which are located between adjacent ones of said vertical selecting elements to which said bias is applied.

2. An electron source and a grid structure for an electron discharge device comprising a plurality of spaced cathodes, a first network of spaced, parallel selecting elements, each of said plurality of cathodes being interposed between and alternating with the spaced parallel selecting elements of said first network, a second network of spaced, parallel selecting elements spaced from and enclosing said first network and said cathodes, the parallel selecting elements of said second network making an angle with the parallel selecting elements of said first network whereby a plurality of windows are defined by the parallel elements of said first and second networks through which electrons emitted from said cathodes may pass, and connections to the elements of said first and second network to permit the application of a predetermined bias to selected elements of said first network and said second network to prevent passage of electrons through all but a desired window.

3. An electron discharge tube having a cathode assembly comprising a plurality of elongated cathodes of substantially rectangular shape, means to support and space said cathodes parallel to each other and in the same plane, said means comprising a plurality of H-shaped ceramics, each of said plurality of ceramics having an opening in the center of the crosspiece of the H through which one of said plurality of cathodes may pass, one of said ceramics being positioned at the center and one near each end of each one of said plurality of cathodes, the H-shaped ceramics at the centers and at the ends of said plurality of cathodes being positioned to be in aligned rows and to have the arms of the H's in abutment, and three pairs of U-shaped channels, each of said pairs of channels being associated with an aligned row of H-shaped ceramics, each of said channels having a plurality of openings in its bottom to admit two abutting arms of said H-shaped ceramics, said openings being spaced to permit each of said pairs of said channels to fit over the abutting arms of its associated aligned row of H-shaped ceramics to thereby maintain the cathodes held by the H-shaped ceramics in rigid and parallel spaced alignment.

4. The cathode assembly as recited in claim 3 wherein each of the H-shaped ceramics has a U-shaped section cut from the arms of the H in alignment with the cross bar of the H whereby openings between each two abutting H-shaped ceramics of said plurality of ceramics are defined wherein rectangular selecting bars may be inserted to be alternate with each one of the plurality of cathodes.

5. A memory electron discharge device having a plurality of elongated, rectangular cathodes, a selecting wire grid comprising spaced parallel vertical selecting wires, said cathodes alternating with and being interposed between said vertical selecting wires, spaced parallel horizontal selecting wires disposed on either side of said vertical selecting wires to define a plurality of windows therewith, a perforated storage target, means to interconnect said vertical selecting wires in a combinatorial system, and means to interconnect said horizontal selecting wires in a combinatorial system to provide a number of leads less than the number of vertical and horizontal selecting wires upon which a bias may be applied to all but selected ones of said horizontal and vertical selecting wires to close all but a desired window to the passage of electrons therethrough.

6. An electron discharge device comprising a source of electrons, a grid, and a target, said grid comprising a first network of parallel, spaced, planar elements, said source of electrons having portions interposed between said first network of parallel spaced planar elements and being substantially coextensive and coplanar therewith, a second network of parallel, spaced, planar elements positioned parallel to said first network and with its elements making an angle with the elements of said first network to form a grid mesh therewith which defines a plurality of windows through which electrons may pass to said target, and connections to said first and second network elements to permit the application of a predetermined bias to certain ones of said elements to close all but a desired one of said windows to the passage of electrons.

7. An electron discharge device comprising a source of electrons, two grid meshes, and two targets one on either side of each of said grid meshes, said two grid meshes comprising a first network of spaced, parallel planar conductors, portions of said source of electrons being interposed between the conductors of said first network and being substantially coextensive and coplanar therewith, a pair of second networks of spaced parallel planar conductors disposed one on either side of said first network, parallel thereto and with the conductors of said pair of second networks making an angle with the conductors of said first network to form two grid meshes therewith which define a plurality of windows through which electrons may pass to said respective targets, and connections to the conductors of said first and second networks to permit the application of a predetermined bias to selected ones of said conductors to permit the passage of electrons through selected ones of said windows.

8. An electron discharge device as recited in claim 7 wherein said source of electrons comprises a plurality of spaced cathodes having a substantially rectangular cross section, said plurality of cathodes being alternately disposed with and between the conductors of said first network.

9. An electron discharge device as recited in claim 7 wherein each of said two targets has perforations aligned with said windows to permit the passage of electrons therethrough, and there is provided in addition for each of said targets means to visually and electrically indicate when and through which of said target perforations said electrons are passing.

10. An electron discharge device comprising a plurality of spaced cathodes, a grid and a target, said grid comprising a first network of spaced parallel planar wires of square cross section, said plurality of cathodes each being of rectangular cross section and being alternately disposed with and between the spaced, parallel planar wires of said first network and being substantially coplanar and coextensive therewith, a second network of spaced parallel planar wires of square cross section positioned parallel to said first network and with its wires making an angle with the wires of said first network to form a grid mesh therewith which defines a plurality of windows through which electrons may pass to said target and connections to said wires of said networks to permit the application of a predetermined bias to selected ones of said wires to close all but a desired one of said windows to the passage of electrons.

11. An electron discharge device as recited in claim 10 wherein said target has perforations aligned with said windows to permit the passage of electrons therethrough and there is provided in addition means to visually and electrically indicate when and through which of said target perforations said electrons are passing.

12. An electron discharge device comprising a plurality of spaced cathodes, two grid meshes, and two targets on either side of said grid meshes, said two grid meshes comprising a first network of spaced parallel planar wires of square cross section, each of said plurality of cathodes being alternately disposed with and between the spaced parallel planar wires of said first network, and being substantially coplanar and coextensive therewith, a pair of second networks of spaced parallel planar wires of square cross section, each of said pair of second networks being disposed on either side of said first network and parallel thereto, the wires of each of said pair of second networks making an angle with the wires of said first network to form two grid meshes therewith which define a plurality of windows through which electrons may pass to said targets, and connections to said wires of said networks to permit the application of a predetermined bias to selected ones of said wires to close all but a desired one of said windows to the passage of electrons.

13. An electron discharge device as recited in claim 12 wherein each of said two targets has perforations aligned with said windows to permit the passage of electrons therethrough and there is provided in addition for each of said targets means to visually and electrically indicate when and through which of said target perforations said electrons are passing.

14. An electron discharge device as recited in claim 12 wherein each of said two targets include a plurality of secondary emissive, insulatingly supported eyelets each one of said plurality of eyelets being aligned opposite each one of said plurality of windows defined by said grid mesh.

15. An electron discharge device as claimed in claim 14 wherein each of said two targets includes a metallic plate and a metallic writing plate, said collector plate and writing plate being spaced on either side of said plurality of eyelets and capacitively coupled thereto, both said plates having a plurality of perforations aligned with said eyelets, and said collector plate being positioned between said eyelets and said grid mesh.

16. An electron storage tube comprising a source of electrons, a grid comprising a set of spaced, planar, vertical selecting wires and two sets of spaced planar horizontal selecting wires each of said two sets being parallel to and on either side of said spaced planar vertical selecting wires, portions of said source of electrons being interposed between and coplanar with said vertical selecting wires, and two targets coextensive with and enclosing said two sets of horizontal selecting wires, said targets having insulatingly supported secondary emissive eyelets presented to said source of electrons, means for applying a bias to all but selected ones of said vertical and horizontal selecting wires for causing electrons to strike a selected eyelet, means for causing said selected eyelet to assume a potential indicative of a condition to be stored, and means for deriving from said tube a signal indicative of an eyelet potential previously established.

17. An electron storage tube as recited in claim 16 wherein said means for deriving from said tube a signal indicative of an eyelet potential previously established comprises for each target a Faraday cage having perforations in its walls aligned with the eyelets in the associated target, a group of parallel interconnected reading wires, said wires being positioned within said cage and between the wall perforations to be shielded from said target, and a translucent dielectric plate coated with a fluorescent, secondary emissive substance, said plate being positioned with its coating against a wall of said Faraday cage to be bombarded by electrons which pass through the target eyelets and through the Faraday cage, said coating emitting secondary electrons as a result of said bombardment which are collected by said reading wires to provide, thereby, a means of visual and electrical indication of the eyelet potential.

18. An electron discharge device comprising a plurality of spaced cathodes, each having a rectangular cross section, a network of spaced parallel, planar, vertical selecting wires, each of said plurality of cathodes being interposed between and alternating with said vertical selecting wires, said cathode being substantially coextensive and coplanar therewith, a pair of networks of spaced, parallel planar, horizontal selecting wires, one of said pair of networks being disposed on either side of said network of vertical selecting wires and parallel thereto, the horizontal selecting wires and the vertical selecting wires both having a square cross section and forming two grid meshes which define a plurality of windows through which electrons may pass, a pair of first target assemblies positioned parallel to and enclosing said pair of networks of horizontal selecting wires, each of said first target assemblies including a metallic collector plate opposing one of said networks of horizontal selecting wires, said metallic collector plate having a plurality of perforations each of which is aligned with each of said windows defined by said grid mesh, a plurality of insulatingly supported secondary emissive eyelets, each of said eyelets being aligned with each of said collector plate perforations and said windows, and a metallic writing plate having a plurality of perforations each of which is aligned with each of said eyelets, said collector plate and said writing plate target being capacitively associated with all said eyelets; a pair of second target assemblies positioned parallel to and enclosing said pair of first target assemblies, each of said second target assemblies including a reading plate opposing one of said first target assemblies, said reading plate having a plurality of perforations which are aligned with said writing plate perforations, a Faraday cage parallel to said reading plate, said Faraday cage having a plurality of apertures in its walls which are aligned with said reading plate perforations, a group of parallel interconnected reading wires, said wires being positioned within said Faraday cage and between the apertures in said cage walls to be shielded from said target, and a translucent dielectric plate coated with a fluorescent secondary emissive substance, said plate being positioned proximal to the outside one of said Faraday cage perforated walls to be bombarded by electrons which pass through said Faraday cage and to emit secondary electrons into said Faraday cage responsive to said bombardment, said secondary electrons being collected by said reading wires to provide an electrical signal.

JAN A. RAJCHMAN.

References Cited in the file of this patent

UNITED STATES PATENTS

| Number | Name | Date |
|---|---|---|
| 1,558,111 | Metcalf | Oct. 20, 1925 |
| 1,655,619 | Metcalf | Jan. 10, 1928 |
| 1,748,175 | Holden | Feb. 25, 1930 |
| 1,990,041 | Loewe | Feb. 5, 1935 |
| 2,043,659 | Herriger | June 9, 1936 |
| 2,198,330 | Bull | Apr. 23, 1940 |
| 2,460,398 | Schade | Feb. 1, 1949 |
| 2,494,670 | Rajchman | Jan. 17, 1950 |